(12) United States Patent
Erhardt et al.

(10) Patent No.: US 6,507,157 B1
(45) Date of Patent: Jan. 14, 2003

(54) ELECTRONIC BALLAST SYSTEM WITH DUAL POWER AND DIMMING CAPABILITY

(75) Inventors: Robert Alexander Erhardt, Schaumburg, IL (US); Steven Pilgrim, Waukegan, IL (US); Raymond Kulka, Chicago, IL (US); Ching-Yao Hung, Palatine, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/963,753

(22) Filed: Sep. 25, 2001

(51) Int. Cl.⁷ ............................................. H05B 37/02
(52) U.S. Cl. ...................... 315/224; 315/307; 315/291; 315/DIG. 4; 315/209 R
(58) Field of Search ................................ 315/224, 307, 315/291, 209 R, 247, DIG. 4

(56) References Cited

U.S. PATENT DOCUMENTS

| | | | |
|---|---|---|---|
| 5,216,333 A | 6/1993 | Nuckolls et al. ............ | 315/291 |
| 5,327,048 A | 7/1994 | Troy .......................... | 315/240 |
| 5,559,395 A | 9/1996 | Venkitasubrahmanian .. | 315/247 |
| 5,815,067 A | 9/1998 | Knoble et al. .......... | 340/310.01 |
| 6,075,326 A | 6/2000 | Nostwick ..................... | 315/307 |
| 6,114,816 A | 9/2000 | Nuckolls et al. ............ | 315/324 |
| 6,204,614 B1 | 3/2001 | Erhardt ........................ | 315/307 |
| 6,326,740 B1 * | 12/2001 | Chang et al. ................ | 315/194 |

* cited by examiner

Primary Examiner—Don Wong
Assistant Examiner—Tuyet T. Vo

(57) ABSTRACT

Control circuitry for controlling the output power of an electronic ballast system having a power supply branch circuit having power lines comprising a line voltage line and a common line, and a ballast stage having (i) inputs connected to the power lines for providing power to the lamp, (ii) internal power control feedback circuitry that defines a feedback loop for controlling the amount of power applied to the lamp, and (iii) a control signal input for receiving a control signal that affects operation the internal power control feedback circuitry and the level of power outputted by the ballast stage. The control circuitry comprises a first circuit having an input for connection to one of the power lines. The first circuit generates a control signal for input into the control input of the ballast stage. The control circuitry having a first predetermined magnitude when one of the power lines is connected to the input of the first circuit and a second predetermined magnitude when the power lines are isolated from the input of the first circuit. The control circuitry further comprises a second circuit having a first state for reducing the first and second predetermined magnitudes of the control signal by a predetermined increment so as to effect step dimming of the lamp and a second state that maintains the first and second predetermined magnitudes of the control signal.

12 Claims, 3 Drawing Sheets

ELECTRONIC BALLAST SYSTEM WITH DUAL POWER AND DIMMING CAPABILITY

BACKGROUND OF THE INVENTION

1) Field of the Invention

The present invention relates generally to an electronic ballast that provides both dual power output for use with two different wattage lamps and dimming capability wherein either wattage lamp can be dimmed.

2) Problem to be Solved

Electronic ballasts that provide a bi-level output for use with different wattage lamps are known in the art. Some examples of these electronic ballast are described in U.S. Pat. Nos. 5,327,048 and 6,204,614. Ballasts that provide dimming capability are also known in the art. Examples of these types of ballasts are described in U.S. Pat. Nos. 5,327,048, 5,559,395 and 6,204,614. However, the ballast described in the aforementioned patents cannot simultaneously provide dual-power capability for powering either a relatively higher wattage lamp and a relatively lower wattage lamp and effect dimming of either lamp. What is needed is an electronic ballast that is configured to provide a bi-level (or dual power) output for powering two different wattage lamps and at the same time, enable dimming of either lamp.

SUMMARY OF THE INVENTION

In a first aspect, the present invention is directed to control circuitry for controlling the output power of an electronic ballast system having a power supply branch circuit having power lines comprising a line voltage line and a common line, and a ballast stage having (i) inputs connected to the power lines for providing power to a lamp, (ii) internal power control feedback circuitry that defines a feedback loop for controlling the amount of power applied to the lamp, and (iii) a control signal input for receiving a control signal that affects operation of the internal power control feedback circuitry and the level of power outputted by the ballast stage. In one embodiment, the control circuitry comprises a first circuit having an input for connection to one of the power lines. The first circuit generates a control signal for input into the control signal input of the ballast stage. The control circuitry has a first predetermined magnitude when one of the power lines is connected to the input of the first circuit and a second predetermined magnitude when neither of the power lines is connected to the input of the first circuit. The control circuitry further comprises a second circuit having a first state for reducing the first and second predetermined magnitudes of the control signal by a predetermined increment so as to effect step dimming of the high intensity discharge lamp and a second state that maintains the first and second predetermined magnitudes of the control signal so as to effect operation of the lamp at full brightness.

In one embodiment, the second circuit includes an input for receiving one of the power lines and is configured to be responsive to the application of one of the power lines to the input of the second circuit. The second circuit has the first state when one of the power lines is connected to the input of the second circuit and the second state when neither of the power lines is connected to the input of the second circuit.

In another embodiment, the second circuit includes an input for receiving one of the power lines and is configured to be responsive to the application of one of the power lines to the input of the second circuit. The second circuit has a first state when neither one of the power lines is connected to the input of the second circuit and the second state when one of the power lines is connected to the input of the second circuit.

A feature of the control circuitry of the present invention is that it can be used with different types of arc discharge lamps, such as HID lamps and fluorescent lamps.

DESCRIPTION OF THE DRAWINGS

The features of the invention are believed to be novel and the elements characteristic of the invention are set forth with particularity in the appended claims. The invention itself, both as to organization and method of operation, may best be understood by reference to the detailed description which follows taken in conjunction with the accompanying drawings in which:

DETAILED DESCRIPTION OF THE PREFERRED EMBODIMENTS

Figure 1:
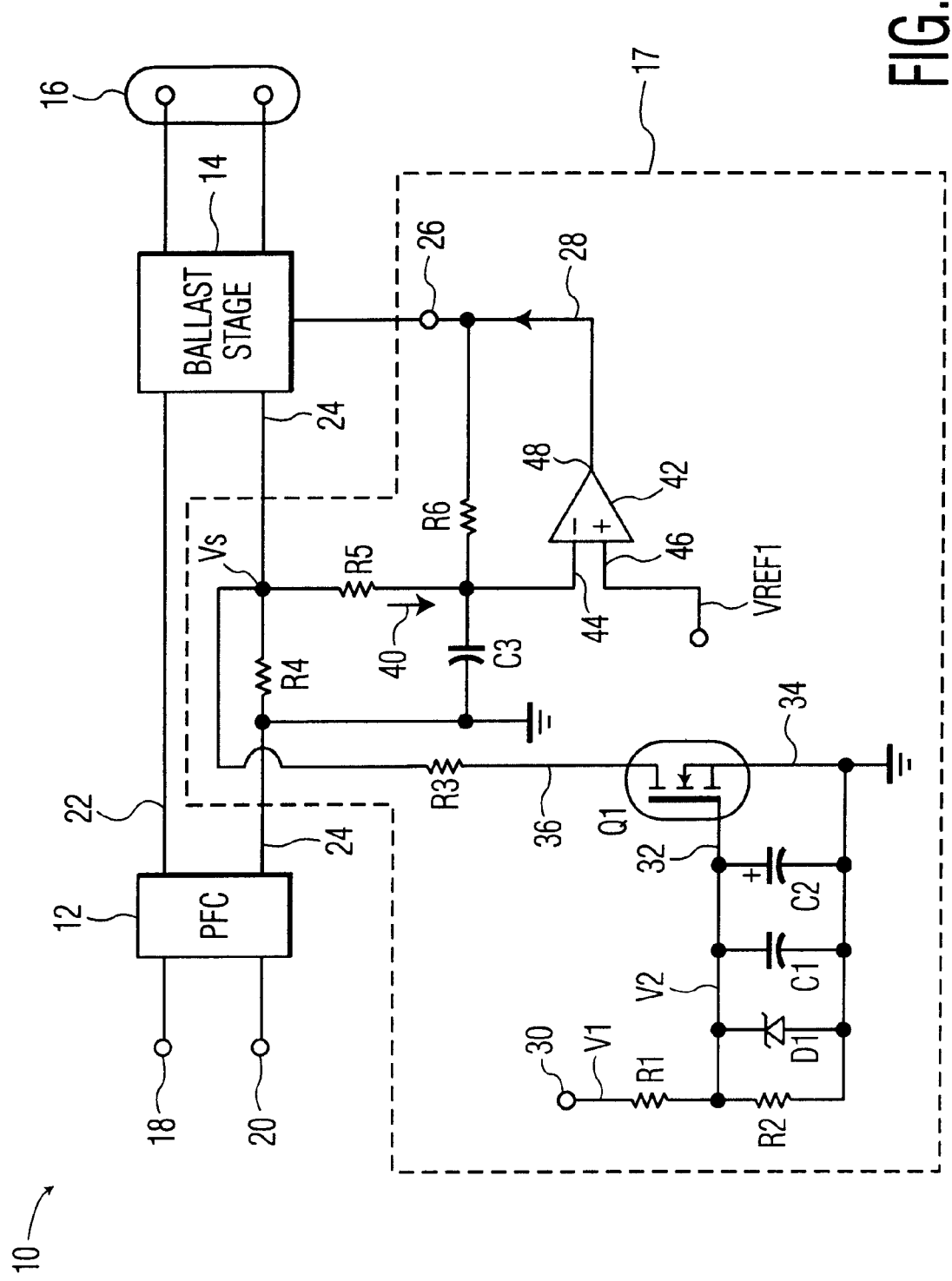
FIG. 1 is a partially schematic, partially block diagram of an electronic ballast system in accordance with one embodiment of the present invention.

Referring to FIG. 1, there is shown one embodiment of the electronic ballast system of the present invention. Ballast system 10 generally comprises AC/DC power factor correction (PFC) circuit 12, ballast stage 14, lamp 16 and control circuitry 17. Lamp 16 can be configured as one of a variety of lamps, such as an arc discharge lamp or an HID (high-intensity-discharge) lamp. For purposes of describing the invention, the ensuing description is in terms of lamp 16 being configured as a HID lamp. Control circuitry 17 will be discussed in detail in the ensuing description. Examples of PFC circuit 12, ballast stage 14 and HID lamp 16 are described in U.S. Pat. No. 6,204,614, the disclosure of which is incorporated herein by reference. PFC circuit 12 includes inputs 18 are 20 that are connected to a line voltage line and a common or neutral line, respectively. Voltage line 22 and neutral line 24 are connected between PFC circuit 12 and the input power stage of ballast stage 14.

Ballast stage 14 further includes an internal power control feedback circuit (not shown) that controls the output current or power delivered to lamp 16. The power control feedback circuit (not shown) defines a feedback loop and includes circuitry that provides a status signal that represents lamp current or power. Typically, the status signal comprises an error signal produced by an error amplifier of the power control feedback circuitry. A voltage divider network is used to provide a reference voltage that is inputted into the error amplifier. One commercially available electronic HID ballast having such feedback circuitry is the MHC070 electronic HID ballast manufactured by North American Philips Corporation. Another type of power control loop similar to the control loop used in the MCH070 is described in U.S. Pat. No. 5,229,927, the disclosure of which is incorporated herein by reference. It is to be understood that the control circuitry of the present invention is fully compatible with the feedback circuitry described in U.S. Pat. No. 5,229,927 as well as other electronic HID ballasts employing feedback loop schemes to control output power or current to an HID lamp.

In accordance with the present invention, ballast stage 14 is configured to include input 26 for receiving control signal 28 that is generated by control circuitry 17. Control signal 28 affects the operation of the internal circuitry of ballast stage 14 so as to control the level of power applied to lamp 16 and dim lamp 16 simultaneously. Specifically, control signal 28 causes the current/power applied to the lamp 16 to increase when the magnitude of control signal 28 increases, and causes the current/power applied to the lamp 16 to decrease when the magnitude of control signal 28 decreases.

Control circuit 17 comprises input 30 for connection to either the line voltage line or the common or neutral line. When input 30 is connected to either the line voltage line or common or neutral line, a half-wave rectified line voltage signal V1 is produced at input 30 with respect to circuit ground. Resistors R1 and R2 form a voltage divider network that reduces voltage V1 to voltage level V2 which is suitable for operating transistor Q1. Resistor R1 also limits the current flowing into input 30. In one embodiment, transistor Q1 is an N-channel MOSFET transistor and has gate 32, source 34 and drain 36. However, other suitable transistors can be used as well. Filter capacitor C1 and Zener diode D1 are coupled across resistor R2. Capacitor C1 filters out the AC component of the voltage V2 thereby producing a suitable DC voltage signal for operation of the transistor Q1. Zener diode D1 limits the voltage applied to gate 32 of transistor Q1. In a preferred embodiment, the values of resistors R1 and R2 are selected to ensure that the voltage V2 is sufficient to fully operate transistor Q1 and to further ensure that the time constant of provided by resistor R2 and capacitor C1 is relatively long. Resistor R2 discharges capacitor C1 when the power line (i.e. line voltage or neutral line) is removed from input 30. Electrolytic capacitor C2 filters out any AC component of voltage V2 at gate 32 of transistor Q1. Drain 34 is coupled to circuit ground.

Resistor R3 is connected between source 36 and input 24 of ballast stage 14. Resistor R4 is in series with neutral or common line 24 and senses the DC current flowing through the power stage of ballast stage 14. The DC voltage on neutral line 24 is constant. If the input current flowing through resistor R4 is I, then the sensed voltage Vs will be Vs=R4×I. When the voltage applied to ballast stage 14 is constant, the power of the ballast is proportional to the current flowing through resistor R4. Thus, the current sensed by resistor R4 provides a direct measure of power outputted by ballast stage 14. Resistor R5 and capacitor C3 cooperate to form a filter circuit for removing any AC component from the current sensed by resistor R4. The filter stage outputs a DC current signal, indicated by arrow 40, that is indicative of the output power of ballast stage 14.

Amplifier 42 is configured as an error amplifier. Amplifier 42 includes inverting (−) input 44 that is coupled to the junction of resistor R5, capacitor C3 and feedback resistor R6. Sensed voltage Vs is applied to the inverting input 44. Amplifier 42 further includes non-inverting (+) input 46. Feedback resistor R6 is connected between the inverting (−) input 44 and output 48 of amplifier 42. Resistors R5 and R6 also set the gain of amplifier 42. A predetermined reference voltage $V_{REF1}$ is applied to non-inverting (−) input 46. Control signal 28 is outputted by amplifier 42 at output 48. Amplifier 42 can be realized by any one of a number of commercially available amplifiers.

When input 30 is connected to either of the power lines, voltage V2 is produced and applied to gate 32 of transistor Q1. As a result, transistor Q1 is turned "ON" and resistors R3 and R4 are configured in parallel. Thus, the equivalent sensing resistance, formerly only the resistance of resistor R4, is now equal to the parallel resistance of resistors R3 and R4. As a result, sensed voltage Vs is reduced. Since the reference voltage $V_{REF1}$ is constant, the difference in magnitude between reference voltage $V_{REF1}$ and Vs increases. Amplifier 42 amplifies this difference and outputs control signal 28 that has a magnitude which is proportional to the difference between $V_{REF1}$ and Vs. Thus, as voltage Vs decreases, the magnitude of control signal 28 increases thereby causing the output power of ballast 14 to increase to a relatively high level. As a result, the current/power applied to lamp 16 increases.

When input 30 is disconnected from the power line (i.e. neither power line is connected to input 30), resistor R2 functions as a discharge path to capacitor C1. The discharge of capacitor C1 pulls gate 32 of transistor Q1 to circuit ground thereby turning transistor Q1 "OFF". When transistor Q1 is "OFF", resistor R3 is taken out of the parallel configuration with resistor R4. Thus, the equivalent sensing resistance is now equal to the resistance of resistor R4. As a result, sensed voltage Vs increases and approaches the constant reference voltage $V_{REF1}$ thereby reducing the difference between the magnitudes of reference voltage $V_{REF1}$ and sensed voltage Vs. Therefore, the magnitude of control signal 28 is relatively lower than when input 30 is connected to either of the power lines. As a result, the current/power applied to lamp 16 is decreased.

Therefore, control signal 28 can have either a first predetermined magnitude (i.e. voltage level) or a second predetermined magnitude, depending upon whether input 30 is left open or connected to either one of the power lines.

As described in the foregoing description, control signal 28 controls ballast stage 14 to vary the current or power supplied to lamp 16. In accordance with the invention, ballast stage 14 is configured to have input circuitry for receiving control signal 28, which is inputted into input 26, and additional circuitry that allows control signal 28 to vary the operational characteristics of the feedback loop of ballast stage 14. In one embodiment, ballast stage 14 includes a switch circuit and a voltage divider network comprising a plurality of resistors wherein voltage divider network provides a reference voltage to the error amplifier in the feedback circuit. When control signal 28 has a first magnitude, the switch circuit switches one of the resistors out of the voltage divider network so as to provide a first reference voltage to the error amplifier. As a result, ballast stage 14 applies a first power level to lamp 16. When control signal 28 has a second magnitude, the switch circuit switches one of the resistors into the voltage divider network so as to provide a second reference voltage to the error amplifier. As a result, ballast stage 14 applies a second power level to lamp 16. In another embodiment, ballast stage 14 is configured to have a switch circuit and corresponding resistor network wherein the resistors are associated with a gain circuit in the feedback loop. The switch circuit is controlled by control signal 28. When control signal 28 has a first magnitude, the switch circuit switches particular resistor or resistors into the gain circuit of the feedback loop so as to vary the gain of the gain circuit and the overall gain of the feedback loop. As a result, ballast stage 14 applies a first power level to lamp 16. When control signal 28 has a second magnitude, the switch circuit switches particular resistor or resistors out of the gain circuit of the feedback loop so as to vary the gain of the gain circuit and the overall gain of the feedback loop. As a result, ballast stage 14 applies a second power level to lamp 16. Furthermore, it is to be understood that control signal 28 can be used to control the output power of ballast stage 14 via any one of a number of suitable schemes, e.g. pulse-width-modulation (PWM), current control, frequency control, etc. In one embodiment, control signal 28 is used in combination with peak current-mode pulse width modulation of a DC/DC buck converter.

In order to effect step dimming, the reference voltage $V_{REF1}$ can be decreased by a predetermined increment so as to decrease the difference between sensed voltage Vs and $V_{REF1}$ and thereby decrease the magnitude of control signal 28. As a result, lamp 16 is dimmed to a predetermined percentage of full brightness. The ensuing description pertains to other embodiments of the present invention which can effect step dimming of lamp 16 by varying the magnitude of reference voltage $V_{REF1}$.

An electronic or manually operated switch (not shown but known in the art) can be used to connect and disconnect input 30 to and from, respectively, one of the power lines.

Therefore, input 26 of ballast stage 14 allows for selection between two output power levels without requiring an additional ballast stage. This feature enables ballast stage 14 to be configured to either one of two states: a first state for powering a first wattage rated lamp, e.g. 100 watts, and a second state for powering a relatively lower, second wattage rate lamp, e.g. 70 watts.

Although particular components have been described in the foregoing description, it is to be understood that suitable substitutions and/or modifications can be made. For example, a P-channel MOSFET transistor could be used in place of the N-channel MOSFET transistor with the appropriate circuit modifications. Such a modification would also enable to the circuitry to operate in an inverse manner, e.g. Q1 would be "OFF" when the power is applied, and "ON" when the power is removed. Furthermore, it is to be understood that transistor Q1 and the resistors and capacitors can be configured in a many other configurations in order to change the voltage drop across particular resistors or to change the gain of amplifier 42. It should be understood that all such variations, and all other variations which readily occur to those skilled in the pertinent art, are considered to be within the scope of the present invention.

Figure 2:
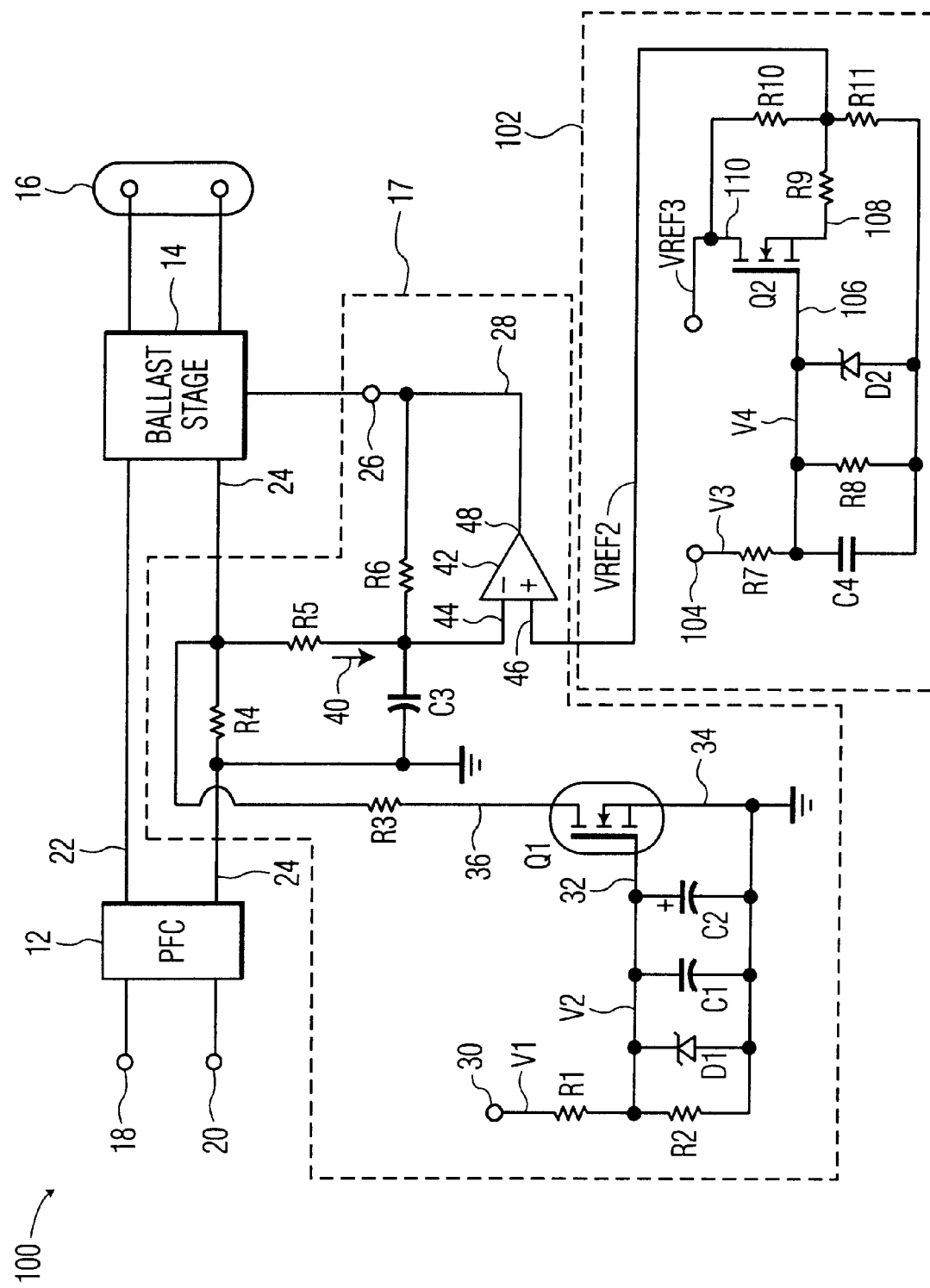
FIG. 2 is a partially schematic, partially block diagram of an electronic ballast system in accordance with another embodiment of the present invention.

Referring to FIG. 2, there is shown another embodiment of the present invention. Lighting system 100 is configured to power a lamp having a first wattage rating or a second lamp having a lower wattage rating, and simultaneously effect step dimming of either lamp. Lighting system 100 generally comprises lighting system 10 with the addition of circuit 102 and the removal of reference voltage $V_{REF1}$. Circuit 102 provides a reference voltage $V_{REF2}$ that replaces reference voltage $V_{REF1}$. Thus, the bi-level control signal 28 is produced in the same manner as described in the foregoing description. However, circuit 102 effects step dimming of lamp 16 no matter which magnitude level is exhibited by control signal 28. Circuit 102 includes input 104 for connection to either of the power lines. When input 104 is connected to either of the power lines, a half-wave rectified line voltage signal V3 is produced at input 104 with respect to circuit ground. Control circuit 102 includes transistor Q2 and resistors R7 and R8. Resistors R7 and R8 form a voltage divider network that reduces voltage V3 to voltage level V4 which is suitable for operating transistor Q2. Resistor R7 also limits the current flowing into input 104. In one embodiment, transistor Q2 is a MOSFET transistor and has gate 106, source 108 and drain 110. However, other suitable transistors can be used as well. Circuit 102 further includes filter capacitor C4 and Zener diode D2 coupled across resistor R8. Capacitor C4 filters out the AC component of the voltage V4 thereby producing a suitable DC voltage signal for operation of the transistor Q2. Zener diode D2 limits the voltage applied to gate 106 of transistor Q2. In a preferred embodiment, the values of resistors R7 and R8 are selected to ensure that the voltage V4 is sufficient to fully operate transistor Q2 and to further ensure that the time constant of provided by resistor R8 and capacitor C4 is relatively long. Resistor R8 discharges capacitor C4 when power is removed from input 104. Reference voltage $V_{REF3}$ is applied to drain 110 of transistor Q2. Circuit 102 further includes resistors R9, R10 and R11. When transistor Q2 is "ON", resistor R9 is connected in parallel with resistor R11 thereby creating a voltage divider network comprising resistors R9, R10, which are in parallel, and resistor R11, which is in series with the parallel combination. Reference voltage $V_{REF2}$ is available at the junction of resistors R9, R10 and R11 and has a first magnitude. When transistor Q2 is "OFF", the connection to resistor R9 is left open thereby configuring the resistor network to comprise a voltage divider network consisting of resistors R10 and R11. This results in reference voltage $V_{REF2}$ having a second magnitude that is larger than the first magnitude.

Amplifier 42 amplifies the difference between sensed voltage Vs, applied to the inverting (−) input 44 of amplifier 42, and reference voltage $V_{REF2}$. Varying the magnitude of reference voltage $V_{REF2}$ between the first magnitude and the second magnitude causes control signal 28 to exhibit either a magnitude that enables lamp 16 to operate at full brightness or a magnitude that effects dimming of lamp 16.

Electronic switch circuits or manually controlled switches, not shown but known in the art, can be used to connect and disconnect one of the power lines (i.e. line voltage or neutral) to and from, respectively, inputs 30 and 104.

EXAMPLE 1

The following example illustrates the use of ballast system 100 to power a 100 watt lamp and then simultaneous effect step dimming of the lamp. First, a 100 watt HID lamp is used to realize lamp 16. Input 30 is connected to one of the power lines. As a result, resistor R3 is switched in parallel to sensing resistor R4 and the magnitude of control signal 28 becomes the first magnitude or level which causes ballast 14 to output sufficient current/power to power the 100 watt lamp. If step dimming of lamp 16 is desired, input 104 is connected to either of the power lines. As a result, transistor Q2 is turned "ON" thereby causing resistor R9 to be in parallel with resistor R10. This causes an increase in the magnitude of reference voltage $V_{REF2}$ and a decrease in the difference or error between sensing voltage Vs and reference voltage $V_{REF2}$. Therefore, the magnitude of control signal 28 is decreased by an amount sufficient to dim lamp 16. If it is no longer desired to achieve step dimming of lamp 16, input 104 is disconnected from the power line thereby turning transistor Q2 "OFF". As a result, resistor R9 is disconnected and switched out of the voltage divider network thereby causing the magnitude of reference voltage $V_{REF2}$ to decrease to its previous level prior to dimming.

EXAMPLE 2

The following example illustrates the use of ballast system 100 to power a 70 watt lamp and then effect step dimming of the lamp. First, a 70 watt HID lamp is used to realize lamp 16. Input 30 is disconnected from the power line. As a result, resistor R3 is switched out of the circuit leaving only sensing resistor R4. This causes an increase in the sensed voltage Vs. As a result, the magnitude of control signal 28 decreases to the second magnitude or level that is relatively lower than the first magnitude and causes ballast 14 to output a relatively lower current/power that is suitable for powering the 70 watt lamp. If step dimming of lamp 16 is desired, input 104 is disconnected from the power line. As a result, transistor Q2 is turned "OFF" thereby causing resistor R9 to be switched out of the circuit. This causes a decrease in the magnitude of reference voltage $V_{REF2}$ and a decrease in the difference or error between the magnitudes of sensing voltage Vs and reference voltage $V_{REF2}$. Therefore, the magnitude of control signal 28 is decreased by an amount sufficient to dim lamp 16. If it is no longer desired to achieve step dimming of lamp 16, input 104 is reconnected to the power line thereby turning transistor Q2 "ON". As a result, resistor R9 is switched into the voltage divider network and in parallel with resistor R10 thereby causing the magnitude of reference voltage $V_{REF2}$ to increase to its previous level prior to dimming.

Figure 3:
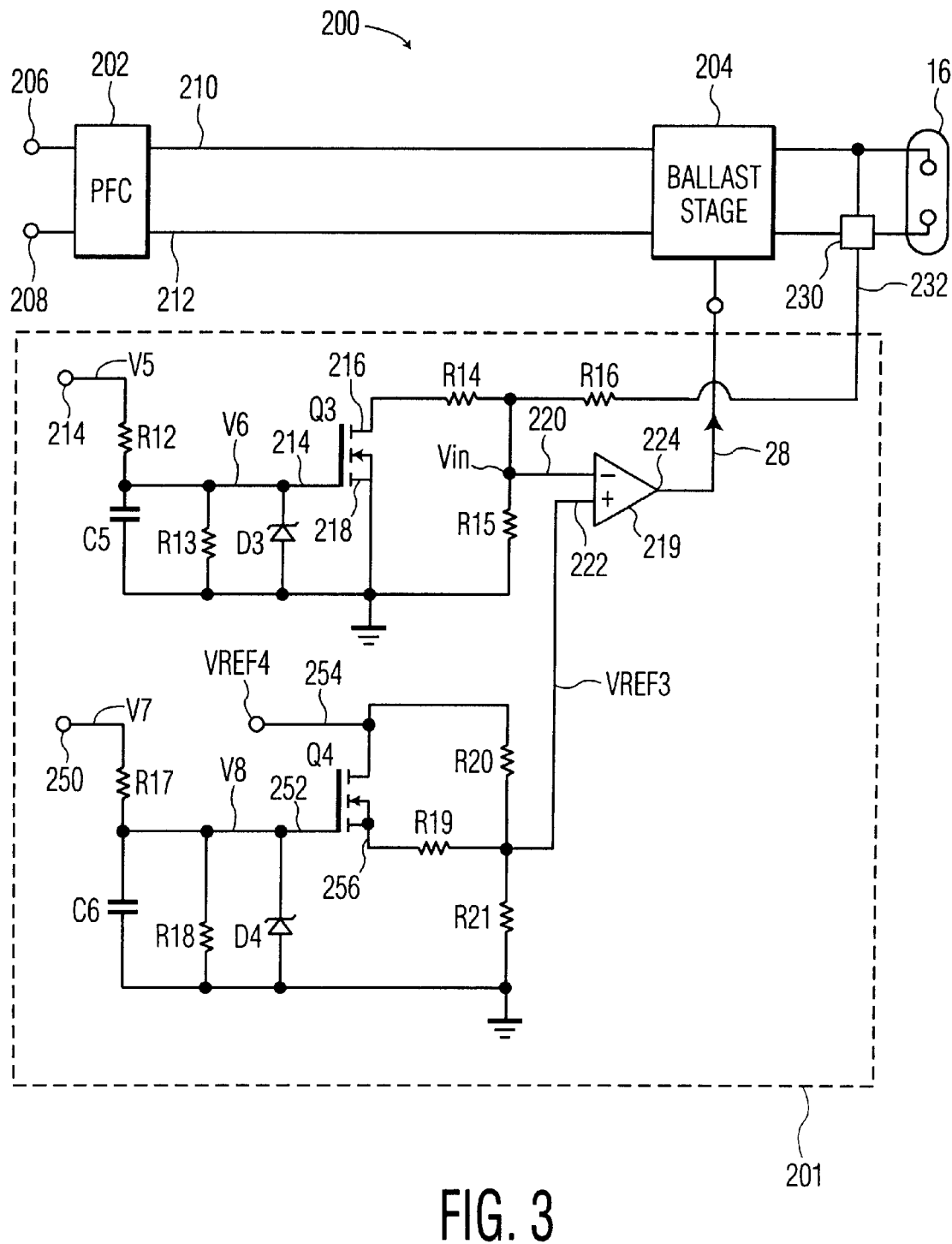
FIG. 3 is a is a partially schematic, partially block diagram of an electronic ballast system in accordance with a further embodiment of the present invention.

Referring to FIG. 3, there is shown another embodiment of the electronic ballast system of the present invention. Electronic ballast system 200 generally comprises control circuitry 201, AC/DC power factor correction (PFC) circuit 202, ballast stage 204, and HID lamp 16. PFC circuit 202 and ballast stage 204 have generally the same configuration and function in the same manner as PFC circuit 12 and ballast stage 14, respectively, described in the foregoing description. PFC circuit 202 includes inputs 206 are 208 that are connected to a line voltage line and a common or neutral line, respectively. Voltage line 210 and neutral line 212 are connected between PFC circuit 202 and the power stage of ballast stage 204.

Control circuitry 201 includes input 214 for connection to either of the power lines. When input 214 is connected to either of the power lines, a half-wave rectified line voltage signal V5 is produced at input 214 with respect to circuit ground. Resistors R12 and R13 form a voltage divider network that reduces voltage V5 to voltage level V6 which is suitable for operating transistor Q3. Resistor R12 also limits the current flowing into input 214. In one embodiment, transistor Q3 is an N-channel MOSFET transistor and has gate 214, source 216 and drain 218. However, other suitable transistors can be used as well. Filter capacitor C5 and Zener diode D3 are coupled across resistor R13. Capacitor C5 filters out the AC component of the voltage V6 thereby producing a suitable DC voltage signal for operation of the transistor Q3. Zener diode D3 limits the voltage applied to gate 214. In a preferred embodiment, the values of resistors R12 and R13 are selected to ensure that the voltage V6 is sufficient to fully operate transistor Q3 and to further ensure that the time constant of provided by resistor R13 and capacitor C5 is relatively long. Resistor R12 discharges capacitor C5 when power is removed from input 214. Drain 218 is coupled to circuit ground.

Control circuitry 201 further includes amplifier 219. Amplifier 219 includes inverting (−) input 220, non-inverting (+) input 222 and output 224. Resistor R14 is connected between source 216 of transistor Q3 and inverting (−) input 220 of amplifier 219. Resistor R15 is connected between inverting (−) input 220 and circuit ground. One end of feedback resistor R16 is connected to inverting (−) input 220. Resistors R15 and R16 set the gain of amplifier 219. A predetermined reference voltage $V_{REF3}$ is applied to non-inverting (−) input 222. The generation of reference voltage $V_{REF3}$ is discussed in the ensuing description. Control signal 28 is outputted by amplifier 219 at output 224. Amplifier 219 is configured as an error amplifier. Thus, control signal 28 is the amplified difference between the magnitudes of reference voltage $V_{REF3}$ and voltage Vin. Amplifier 219 can be realized by any one of a number of commercially available amplifiers.

Ballast system 200 further includes current/power sensor 230 that senses the power applied to lamp 16. Sensor 230 outputs signal 232 that indicates the amount or level of power or current applied to lamp 16. The other end of feedback resistor R16 is connected to the output of sensor 232.

Transistor Q3 switches resistor R14 in and out of the resistor network comprising resistors R14, R15 and R16 so as to change the level of input voltage Vin applied to input 220 and the gain of amplifier 218. When resistor R14 is switched in the network, the gain G of amplifier 219 is represented by equation (1):

$$G(R16/R_P)+1 \qquad (1)$$

wherein $R_P$ is the equivalent resistance of R14 and R15 in parallel configuration. When resistor R14 is switched out of the resistor network, the gain G of amplifier 219 is represented by the equation (2):

$$G(R16/R15)+1 \qquad (2)$$

Specifically, when transistor Q3 is "ON", resistor R14 is connected in parallel with resistor R15 thereby increasing the gain G of amplifier 219. As a result, control signal 28 has a first magnitude that controls ballast stage 204 to output a suitable power/current for powering a relatively high wattage lamp (e.g. 100 watts). When transistor Q3 is "OFF", the resistor R14 is left open. As a result, resistor R14 is switched out of the resistor network thereby decreasing the gain G of amplifier 219. As a result, the magnitude of control signal 28 decreases to a second magnitude that is relatively lower than the first magnitude and is suitable for controlling ballast stage 204 to output suitable current/power to power a relatively low wattage lamp (e.g. 70 watts).

When input 214 is connected to one of the power lines, transistor Q3 is "ON", resistor R14 is switched into the resistor network, the gain G of amplifier 219 increases and control signal 28 exhibits the first magnitude. When input 214 is disconnected from the power line, transistor Q3 is "OFF", resistor R14 is switched out of the resistor network, the gain G of amplifier 218 decreases, and control signal 28 exhibits the second magnitude.

In an alternate embodiment, sensor circuit 230 is internal to ballast stage 204 and ballast stage 204 is configured to output signal 232.

Control circuitry 201 further includes input 250 that is configured to be connected to and disconnected from one of the power lines (i.e. line voltage or neutral). A suitable electronic or manually operated switch may be used to connect and disconnect input 250 to and from, respectively, one of the power lines. When input 250 is connected to either of the power lines, a half-wave rectified line voltage signal V7 is produced at input 250 with respect to circuit ground. Resistors R17 and R18 form a voltage divider network that reduces voltage V7 to voltage V8 which is suitable for operating transistor Q4. Resistor R17 also limits the current flowing into input 250. In one embodiment, transistor Q4 is an N-channel MOSFET transistor and has gate 252, drain 254 and drain 256. However, other suitable transistors can be used as well. Capacitor C6 filters out the AC component of the voltage V8 thereby producing a suitable DC voltage signal for operation of the transistor Q4. Zener diode D4 limits the voltage applied to gate 252 of transistor Q4. In a preferred embodiment, the values of resistors R17 and R18 are selected to ensure that the voltage V8 is sufficient to fully operate transistor Q4 and to further ensure that the time constant provided by resistor R18 and capacitor C6 is relatively long. Resistor R18 discharges capacitor C6 when power is removed from input 250. Reference voltage $V_{REF4}$ is applied to drain 254 of transistor Q4. When transistor Q4 is "ON", resistor R19 is connected in parallel with resistor R20 thereby creating a voltage divider network comprising resistors R19, R20, which are in parallel, and resistor R21, which is in series with the parallel combination.

Reference voltage $V_{REF3}$ is available at the junction of resistors R19, R20 and R21 and has a first magnitude when resistor R19 is in parallel with resistor R20. When transistor Q4 is "OFF", the connection to resistor R19 is left open thereby configuring the resistor network to comprise a voltage divider network consisting of resistors R20 and R21. This results in reference voltage $V_{REF3}$ having a second magnitude that is less than the first magnitude.

Thus, when transistor Q4 is "ON", reference voltage $V_{REF3}$ has a first magnitude and when transistor Q4 is "OFF", reference voltage $V_{REF3}$ has a second magnitude that is less than the first magnitude. As a result, when transistor Q4 is "ON", the difference between the magnitudes of voltage Vin and reference voltage $V_{REF3}$ increases thereby increasing the magnitude of the control signal 28. When transistor Q4 is "OFF", reference voltage $V_{REF3}$ has the second magnitude thereby decreasing the difference in magnitudes between $V_{REF3}$ and Vin. As a result, the magnitude of control signal 28 also decreases. The magnitude of reference voltage $V_{REF4}$ and the resistance values of resistors R19, R20 and R21 are chosen so that the magnitude of control signal 28 is decreased by an amount sufficient to effect step dimming of lamp 16.

EXAMPLE 3

The following example illustrates the use of lighting system 200 to power a 100 watt lamp and then effect step dimming of the lamp. First, a 100 watt HID lamp is used to realize lamp 16. Input 214 is connected to either the line voltage or neutral line. As a result, resistor R14 is switched in parallel to resistor R15 and the magnitude of control signal 28 becomes the first magnitude or level which causes ballast 14 to output sufficient current/power to power the 100 watt lamp. If step dimming of lamp 16 is not desired, input 250 is connected to either of the power lines. As a result, transistor Q4 is turned "ON", resistor R19 is switched into the circuit so as to be in parallel with resistor R20, and reference voltage $V_{REF3}$ exhibits a magnitude that maintains the magnitude of control signal 28 at the first magnitude which is suitable for powering the 100 watt lamp at normal brightness. If step dimming of lamp 16 is desired, input 250 is disconnected from the power lines. As a result, transistor Q4 is turned "OFF" thereby causing resistor R19 to be in open. This causes the magnitude of reference voltage $V_{REF3}$ to decrease by a predetermined increment. This in turn decreases the difference between voltage Vin and reference voltage $V_{REF3}$ thereby causing a decrease in the magnitude of control signal 28 so as to effect step dimming of lamp 16. The magnitude of control signal 28 is decreased by an amount sufficient to dim lamp 16. If it is no longer desired to achieve step dimming of lamp 16, input 250 is reconnected to either of the power lines (i.e. the line voltage or neutral line) thereby turning transistor Q2 "ON". As a result, resistor R9 is switched back into the voltage divider network thereby causing the magnitude of reference voltage $V_{REF3}$ to increase to its previous level prior to step dimming.

Ballast systems 10, 100 and 200 may be used in conjunction with commercially available occupancy detectors or sensors. In such an embodiment, the occupancy sensors or detectors are configured to effect connection and disconnection of either power line to and from, respectively, the appropriate inputs of ballast systems 10, 100 and 200 to achieve step dimming of the lamps so as to conserve energy and prolong the operational life of the lamp.

Although particular components have been described in the foregoing description, it is to be understood that suitable substitutions and/or modifications can be made. Furthermore, modifications can be made to enable the circuitry to operate in an inverse manner. For example, ballast system 100 can be modified so that circuit 102 controls the ballast stage 14 to produce the desired current/power output for powering a first wattage rating lamp (e.g. 100 watts) or a second wattage rating lamp (e.g. 70 watts) while circuitry 17 effects step dimming of the lamp. Similarly, ballast system 200 can be modified so that the circuitry associated with input 250 controls the ballast stage 14 to produce the desired current/power output for powering a first wattage rating lamp (e.g. 100 watts) or a second wattage rating lamp (e.g. 70 watts) while the remaining circuitry associated with input 214 effects step dimming of the lamp. Ballast system 10 can be modified in a similar manner.

Furthermore, ballast stage 14 can be modified to provide two output levels simultaneously for powering two different wattage rating lamps (e.g. 70 watts and 100 watts). In such a configuration, the control circuitry of the present invention effects step dimming of both lamps simultaneously.

Additionally, the components can be configured in a many other configurations in order to change the voltage drop across particular resistors or to change the gain of amplifiers 42 and 218. Although 70 and 100 watt lamps have used as examples, it is to be understood that other wattage lamps may be used. It should be understood that all such variations, and all other variations which readily occur to those skilled in the pertinent art, are considered to be within the scope of the present invention.

Thus, the control circuitry of the present invention:
 a) is relatively simple in construction and requires very few low-cost components;
 b) uses components that do not have to be isolated from the line voltage;
 c) is compatible with feedback circuitry of conventional electronic ballast systems;
 d) is compatible with existing low cost occupancy sensors without needing specialized control circuitry;
 e) enables the electronic ballast system to be easily configured for use with more than one type of lamp (e.g. 70 watt and 100 watt lamps) without having to replace the ballast stage thereby concurrently reducing the number of ballasts that must be stocked by a manufacturer, wholesaler, or retailer;
 f) enables the electronic ballast system to be easily combined with a wide range pre-conditioner, e.g., a 100–277V, so as to allow use of the electronic ballast system in a variety of applications, e.g., 100V, 120V, 127V, 200V, 230V, 240V, 277V, 70W and 100W;
 g) can be used with different types of arc discharge lamps, such as HID lamps and fluorescent lamps; and
 h) enables lighting system manufacturers to retrofit existing electronic ballast systems for use with two lamps by making the modifications in accordance with the present invention.

The principals, preferred embodiments and modes of operation of the present invention have been described in the foregoing specification. The invention which is intended to be protected herein should not, however, be construed as limited to the particular forms disclosed, as these are to be regarded as illustrative rather than restrictive. Variations in changes may be made by those skilled in the art without departing from the spirit of the invention. Accordingly, the foregoing detailed description should be considered exemplary in nature and not limited to the scope and spirit of the invention as set forth in the attached claims.

Thus, what is claimed is:

1. Control circuitry for controlling the output power of an electronic ballast system having a power supply branch circuit having power lines comprising a line voltage line and a common line, and a ballast stage having (i) inputs connected to the power lines for providing power to an arc discharge lamp, (ii) internal power control feedback circuitry that defines a feedback loop for controlling the amount of power applied to the arc discharge lamp, and (iii) a control signal input for receiving a control signal that affects operation the internal power control feedback circuitry and the level of power outputted by the ballast stage, the control circuitry comprising:

a first circuit having an input for connection to one of the power lines, the first circuit generating a control signal for input into the control input of the ballast stage, the control signal having a first predetermined magnitude when one of the power lines is connected to the input of the first circuit and a second predetermined magnitude when the power lines are isolated from the input of the first circuit; and a second circuit having a first state for reducing the first and second predetermined magnitudes of the control signal by a predetermined increment so as to effect step dimming of the arc discharge lamp and a second state that maintains the first and second predetermined magnitudes of the control signal.

2. The control circuitry according to claim 1 wherein the second circuit includes an input for receiving one of the power lines, the second circuit being configured to be responsive to the application of one of the power lines to the input of the second circuit wherein, the second circuit having the first state when one of the power lines is connected to the input of the second circuit and the second state when neither of the power lines is connected to the input of the second circuit.

3. The control circuitry according to claim 1 wherein the first circuit further includes:

a sensing circuit for sensing the input current of the ballast stage and generating a sensed voltage based upon the sensed current;

a third circuit having an input that comprises the input of the first circuit, the third circuit controlling the operation of the sensing circuit so as to increase the sensed voltage when one of the power lines is connected to the input of the third circuit and decrease the sensed voltage when neither one of the power lines is connected to the input of the third circuit; and a fourth circuit for comparing the sensed voltage to a predetermined reference voltage and outputting a difference signal having a magnitude that represents the difference between the sensed voltage and the predetermined reference voltage, the difference signal defining the control signal.

4. The control circuitry according to claim 3 wherein the second circuit includes circuitry for decreasing the predetermined reference voltage by a predetermined increment so as to decrease the magnitude of the difference signal and the magnitude of the control signal so as to effect step dimming of the lamp.

5. The control circuitry according to claim 1 wherein the first circuit further includes:

a sensing circuit for sensing the input current of the ballast stage and generating a sensed voltage based upon the sensed current;

a third circuit having an input that comprises the input of the first circuit, the third circuit controlling the operation of the sensing circuit so as to increase the sensed voltage when neither one of the power lines is connected to the input of the third circuit and decrease the sensed voltage when one of the power lines is connected to the input of the third circuit; and a fourth circuit for comparing the sensed voltage to a predetermined reference voltage and outputting a difference signal having a magnitude that represents the difference between the sensed voltage and the predetermined reference voltage, the difference signal defining the control signal.

6. The control circuitry according to claim 5 wherein the second circuit includes circuitry for decreasing the predetermined reference voltage by a predetermined increment so as to decrease the magnitude of the difference signal and the magnitude of the control signal so as to effect step dimming of the lamp.

7. The control circuitry according to claim 1 wherein the first circuit further comprises:

a sensor circuit for sensing the current and voltage inputted into the ballast stage;

a third circuit having an input for receiving current sensed by the sensing circuit, the third circuit having a first state for generating a voltage having a first magnitude that is based upon the sensed current and a second state for generating a voltage having a second magnitude based upon the sensed current, the third circuit having the first state when one of the power lines is connected to the input of the first circuit and the second state when neither of the power lines is connected to the input of the first circuit; and a fourth circuit for comparing the voltage generated by the third circuit to a predetermined reference voltage and outputting a difference signal having a magnitude that represents the difference between the voltage generated by the third circuit and the predetermined reference voltage, the difference signal defining the control signal.

8. The control circuitry according to claim 7 wherein the second circuit includes circuitry for decreasing the predetermined reference voltage by a predetermined increment so as to decrease the magnitude of the difference signal and the magnitude of the control signal to effect step dimming of the lamp when the second circuit is in the first state.

9. The control circuitry according to claim 1 wherein the first circuit further comprises:

a sensor circuit for sensing the current and voltage inputted into the ballast stage;

a third circuit having an input for receiving current sensed by the sensing circuit, the third circuit having a first state for generating a voltage having a first magnitude that is based upon the sensed current and a second state for generating a voltage having a second magnitude based upon the sensed current, the third circuit having the first state when neither one of the power lines is connected to the input of the first circuit and the second state when one of the power lines is connected to the input of the first circuit; and a fourth circuit for comparing the voltage generated by the third circuit to a predetermined reference voltage and outputting a difference signal having a magnitude that represents the difference between the voltage generated by the third circuit and the predetermined reference voltage, the difference signal defining the control signal.

10. The control circuitry according to claim 9 wherein the second circuit includes circuitry for decreasing the predetermined reference voltage by a predetermined increment so as to decrease the magnitude of the difference signal and the magnitude of the control signal to effect step dimming of the lamp when the second circuit has the first state.

11. An electronic ballast system comprising:

a power supply branch circuit having power lines comprising a line voltage line and a common line;

a ballast stage having inputs for connection to the line voltage line and common line and outputs for providing power to an arc discharge lamp, the ballast stage having internal power control feedback circuitry that defines a feedback loop for controlling the amount of power applied to the lamp and an input for receiving a control signal that affects operation the internal power control feedback circuitry and the level of power outputted by the ballast stage;

a first circuit having an input for connection to one of the power lines, the first circuit generating a control signal for input into the input of the ballast stage, the control signal having a first predetermined magnitude when one of the power lines is connected to the input of the first circuit and a second predetermined magnitude when neither one of the power lines is connected to the input of the first circuit;

a second circuit having a first state for reducing the first and second predetermined magnitudes of the control signal by a predetermined increment so as to effect step dimming of the arc discharge lamp and a second state that maintains the first and second predetermined magnitudes of the control signal; and a switch circuit configured for connecting and disconnecting one of the power lines to and from, respectively, the input of the first circuit.

12. The electronic ballast system according to claim 11 wherein the second circuit includes an input for connection to one of the power lines, the second circuit being configured to be responsive to the application of one of the power lines to the input of the second circuit wherein the second circuit has the first state when one of the power lines is connected to the input of the second circuitry and the second state when neither one of the power lines is connected to the input of the second circuit.

* * * * *